United States Patent
Tomita et al.

(10) Patent No.: US 10,077,836 B2
(45) Date of Patent: Sep. 18, 2018

(54) SELECTOR

(71) Applicant: Panasonic Intellectual Property Management Co., Ltd., Osaka (JP)

(72) Inventors: Hironori Tomita, Nara (JP); Teruyuki Takizawa, Osaka (JP); Hideki Shirane, Osaka (JP); Takeshi Nakazawa, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/430,177

(22) Filed: Feb. 10, 2017

(65) Prior Publication Data
US 2017/0248228 A1 Aug. 31, 2017

(30) Foreign Application Priority Data

Feb. 25, 2016 (JP) ................. 2016-034689

(51) Int. Cl.
*B60K 20/00* (2006.01)
*F16H 61/22* (2006.01)
(Continued)

(52) U.S. Cl.
CPC ............. *F16H 61/22* (2013.01); *F16H 59/10* (2013.01); *F16H 61/24* (2013.01);
(Continued)

(58) Field of Classification Search
CPC .......... F16H 61/22; F16H 61/24; F16H 59/10; F16H 2059/0269; F16H 2059/0295; F16H 2061/242
See application file for complete search history.

(56) References Cited

U.S. PATENT DOCUMENTS 5,852,953 A * 12/1998 Ersoy ................. F16H 59/0204
74/471 XY
5,899,115 A * 5/1999 Kataumi ............. F16H 59/0204
74/473.12
(Continued)

FOREIGN PATENT DOCUMENTS

JP 2002-274210 9/2002

*Primary Examiner* — Zakaria Elahmadi
(74) *Attorney, Agent, or Firm* — McDermott Will & Emery LLP

(57) ABSTRACT

A selector includes a lever guide, an operating lever, and a stopper. The lever guide has first and second movable-path slits therein. The first movable-path slit extends from a first position to a second position along a first direction. The second movable-path slit extends along a second direction different from the first direction as to intersect the first movable-path slit at an intersection position. The second movable-path includes a third position. The operating lever is movable in along the first and second movable-path slits. The operating lever is configured to move to the first position through the first and second movable-path slits. The stopper slides and contacts the operating lever when the operating lever moves from the third position to the first position. The stopper slides and contacts the operating lever when the operating lever moves from the first position to the third position. The stopper opens and closes an opening-and-closing target path out of the first movable-path slit between the second position and the intersection position in conjunction with a movement of the operating lever.

15 Claims, 9 Drawing Sheets

(51) Int. Cl.
  *F16H 59/10* (2006.01)
  *F16H 61/24* (2006.01)
  *F16H 59/02* (2006.01)

(52) U.S. Cl.
  CPC .............. *F16H 2059/0269* (2013.01); *F16H 2059/0295* (2013.01); *F16H 2061/242* (2013.01)

(56) References Cited

U.S. PATENT DOCUMENTS

| | | | | |
|---|---|---|---|---|
| 6,148,686 | A * | 11/2000 | Kataumi | F16H 59/0204 74/473.12 |
| 6,718,842 | B1 * | 4/2004 | Bofias | F16H 59/044 74/473.12 |
| 7,487,850 | B2 * | 2/2009 | Lucas | B60K 1/00 180/65.1 |
| 2002/0152827 | A1 * | 10/2002 | Hayashi | F16H 59/0278 74/473.3 |
| 2002/0166400 | A1 | 11/2002 | Syamoto et al. | |
| 2010/0202766 | A1 * | 8/2010 | Takizawa | G03B 5/00 396/55 |
| 2010/0242658 | A1 * | 9/2010 | Patzold | F16H 59/0204 74/473.24 |
| 2012/0182472 | A1 * | 7/2012 | Inata | G03B 5/00 348/374 |
| 2014/0083227 | A1 * | 3/2014 | Garabello | F16H 63/302 74/473.36 |
| 2014/0354836 | A1 * | 12/2014 | Takizawa | G03B 5/00 348/208.11 |
| 2014/0362242 | A1 * | 12/2014 | Takizawa | G03B 5/00 348/208.11 |

* cited by examiner

SELECTOR

TECHNICAL FIELD

The present invention relates to a selector configured to select a shift position of an operating lever.

DESCRIPTION OF RELATED ART

Japanese Patent Laid-open Publication No. 2002-274210 discloses a shift lock apparatus serving as a selector configured to select a shift position of an operating lever. This shift lock apparatus restricts the movement path of a shift lever by electromagnetic driving of a solenoid.

SUMMARY

A selector includes a lever guide, an operating lever, and a stopper. The lever guide has a first movable-path slit and a second movable-path slit therein. The first movable-path slit extends from a first position to a second position along a first direction. The second movable-path slit extends along a second direction different from the first direction as to intersect the first movable-path slit at an intersection position. The second movable-path includes a third position. The operating lever is movable in along the first movable-path slit and the second movable-path slit. The operating lever is configured to move to the first position through the first movable-path slit and the second movable-path slit to select the first position and configured to move to the second position to the first position through the first movable-path slit and the second movable-path slit to select the second position. The stopper overlaps the lever guide and sliding in conjunction with a movement of the operating lever. The stopper includes a first contact section, a second contact section, and an opening-and-closing section. The first contact section slides and contacts the operating lever when the operating lever moves from the third position to the first position. The second contact section slides and contacts the operating lever when the operating lever moves from the first position to the third position. The opening-and-closing section opens and closes an opening-and-closing target path out of the first movable-path slit between the second position and the intersection position in conjunction with the movement of the operating lever. The opening-and-closing section blocks the opening-and-closing target path in conjunction with a sliding of the first contact section, and opens the opening-and-closing target path in conjunction with a sliding of the second contact section.

This selector can restrict a movement path by a method different from electromagnetic driving.

DETAILED DESCRIPTION OF PREFERRED EMBODIMENT

Figure 1A:
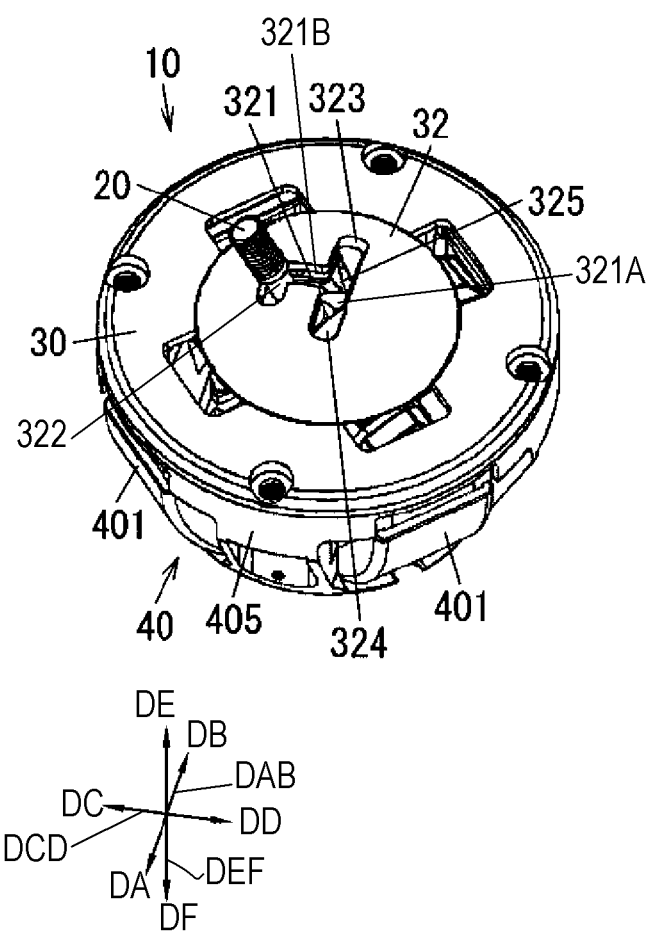
FIG. 1A is a perspective view of a selector according to an exemplary embodiment.
Figure 1B:
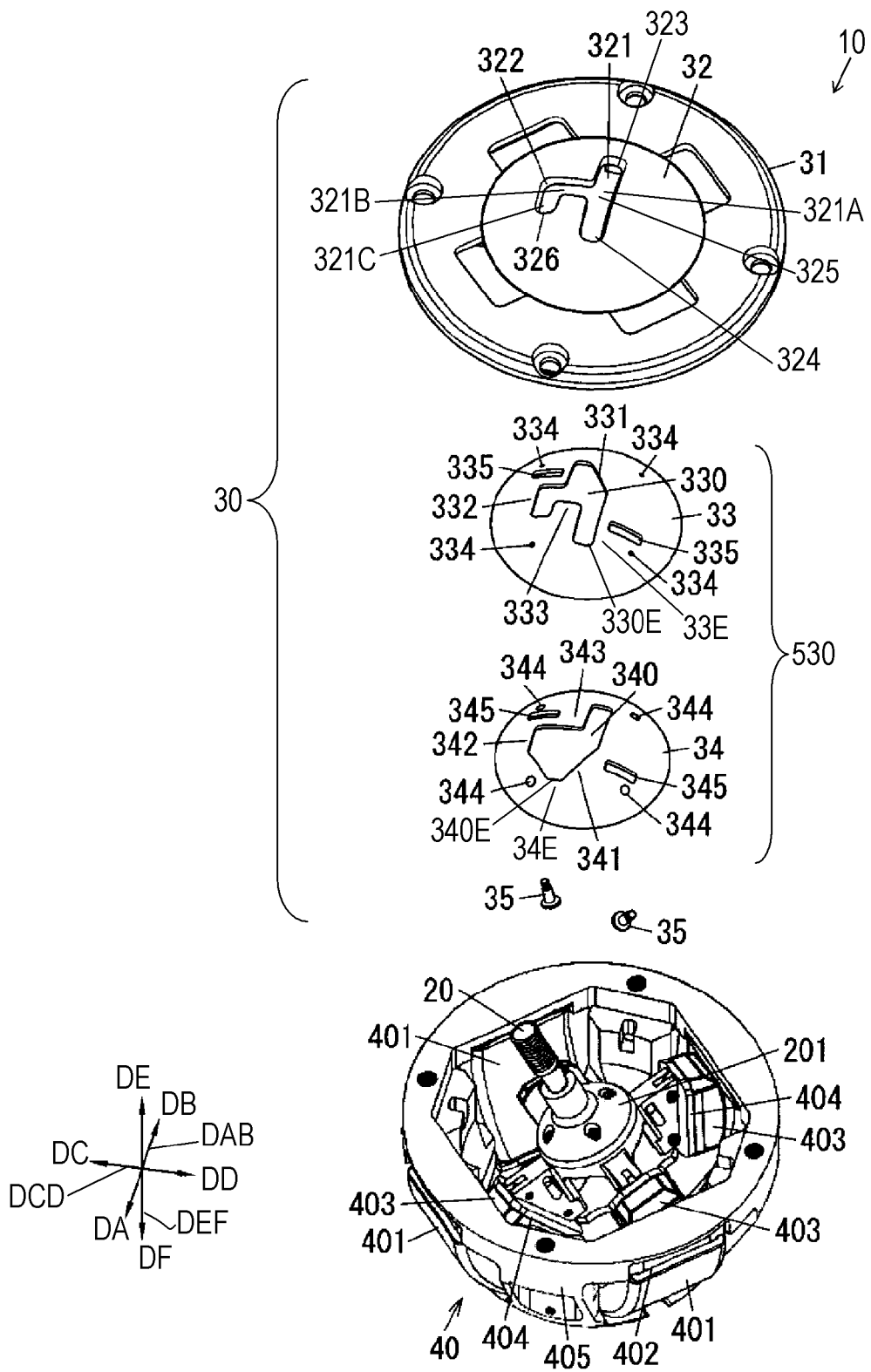
FIG. 1B is an exploded perspective view of the selector according to the embodiment.
Figure 2:
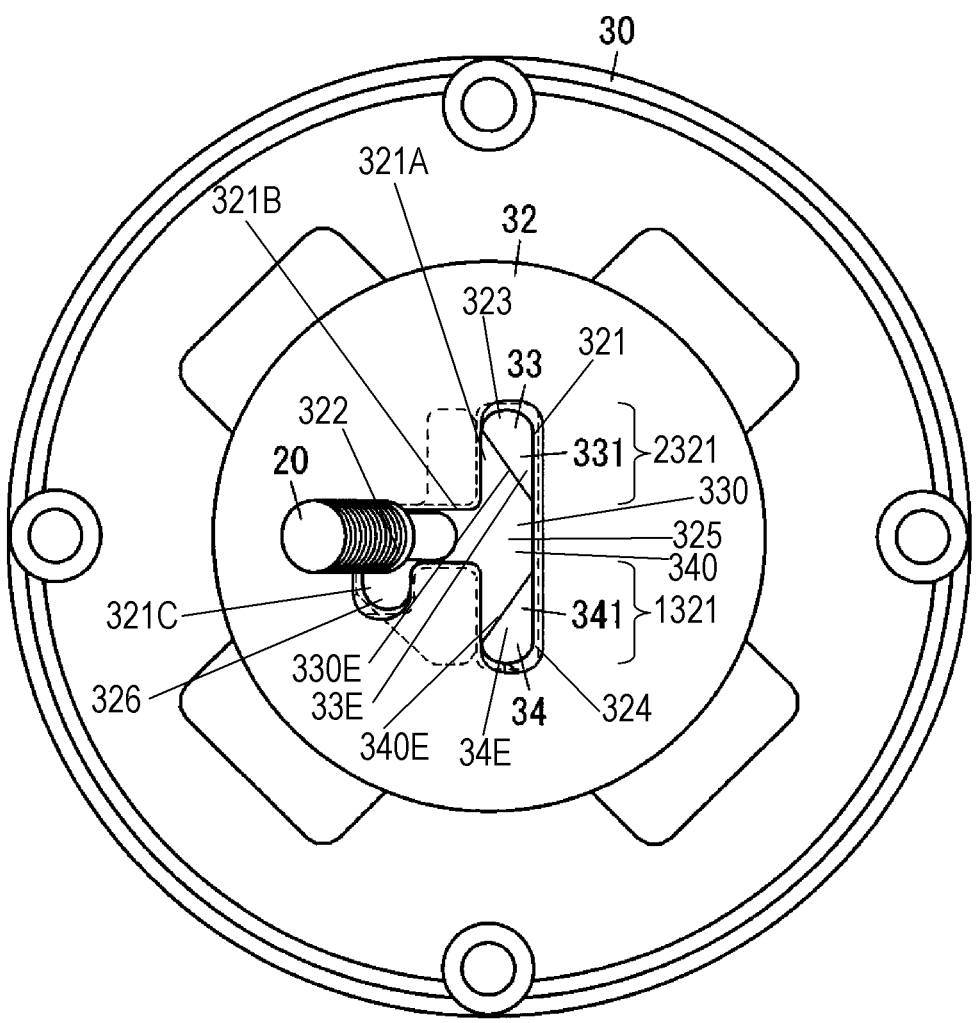
FIG. 2 is a plan view of the selector according to the embodiment.
Figure 3:
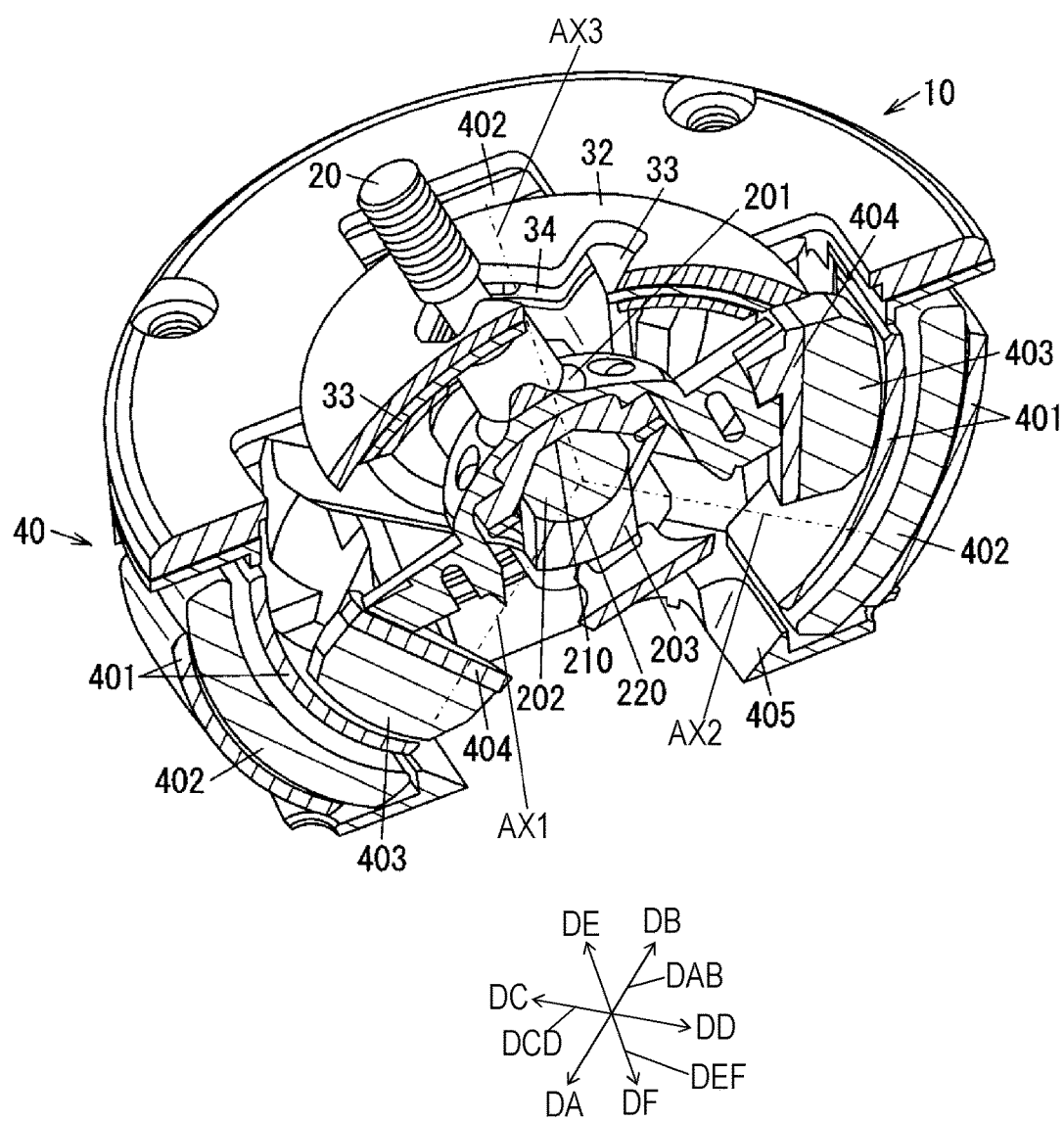
FIG. 3 is a cross-sectional view of the selector according to the embodiment.

FIG. 1A is a perspective view of selector 10 according to an exemplary embodiment. FIG. 1B is an exploded perspective view of selector 10. FIG. 2 is a plan view of selector 10. FIG. 3 is a cross-sectional view of selector 10. In FIG. 1A to FIG. 3, front direction DA along front-rear direction DAB, and rear direction DB along front-rear direction DAB and opposite to front direction DA are defined. Similarly, leftward direction DC along right-left direction DCD different from front-rear direction DAB, and rightward direction DD along right-and-left direction DCD and opposite to leftward direction DC are defined. In the embodiment, right-left direction DCD is perpendicular to front-rear direction DAB. Similarly, upward direction DE along up-down direction DEF perpendicular to front-rear direction DAB and right-left direction DCD, and downward direction DF along up-down direction DEF and opposite to upward direction DE are defined. These terms, and terms of directions, such as "upper surface" and "lower surface", indicate directions indicate relative directions determined only by relative positional relationships of constituent components of selector 10, and do not indicate absolute directions, such as a vertical direction.

As illustrated in FIG. 1A, selector 10 includes guide section 30 and driving section 40. Driving section 40 includes operating lever 20.

Selector 10 is installed to, for example, a vehicle, and is used to change an operation mode of the vehicle. Specifically, a driver (an operator) moves operating lever 20 to one selection position of a drive position (D position) and a reverse position (R position) along a predetermined movement path to selectively switch the operation mode between a drive mode for moving the vehicle forward and a reverse mode for moving the vehicle backward.

As illustrated in FIG. 1B, guide section 30 includes cover 31, lever guide 32, stopper device 530, and two guide pins 35. Stopper device 530 includes stoppers 33 and 34.

Cover 31 has a disk shape. Lever guide 32 is provided at the center of the disk shape.

Lever guide 32 is made of material, such as ceramic, synthetic resin, or metal, and has an upwardly-convex surface. Lever guide 32 has therein movable-path slit 321 into which operating lever 20 is inserted. Movable-path slit 321 restricts a movement path through which the operating lever 20 moves. Movable-path slit 321 includes movable-path slit 321A extending in front-rear direction DAB, and movable-path slit 321B extending in right-left direction DCD different from front-rear direction DAB. Movable-path slits 321A and 321B intersect each other at intersection position 325. In accordance with the embodiment, movable-path slit 321A intersects movable-path slit 321B substantially perpendicularly to movable-path slit 321A. The movable-path slit linearly extends from R position 323 to D position 324 in front-rear direction DAB. Movable-path slit 321B extends from intersection position 325 to home position (HP) 322. Operating lever 20 starts to move from home position 322. When moving from home position 322 to R position 323, operating lever 20 moves from home position 322 to intersection position 325 in rightward direction DD along right-left direction DCD, and subsequently, moves from intersection position 325 to R position 323 in rear direction DB along front-rear direction DAB. When moving from home position 322 to D position 324, operating lever 20 moves from home position 322 to intersection position 325 in rightward direction DD along right-left direction DCD, and then, moves from intersection position 325 to D position 324 in rightward direction DD along right-left direction DCD. In accordance with the embodiment, movable-path slit 321 further includes movable-path slit 321C extending from home position 322 to B position 326 in front direction DA along front-rear direction DAB. A driver can move operating lever 20 from home position 322 to B position 326 along movable-path slit 321C to select a brake mode.

Stopper 33 is made of a thin hard material, such as metal, and has a curved surface along the curved surface of lever guide 32. Stopper 33 has four protrusions 334. Stopper 33 has opening 330 and two guide holes 335 therein, and overlaps lever guide 32 in downward direction DF. Stopper 33 has edge section 33E connected to edge 330E facing opening 330.

Four protrusions 334 are provided on an upper surface of stopper 33 so that four protrusions 334 contact a lower surface of lever guide 32 to form a gap between stopper 33 and lever guide 32 while stopper 33 overlaps lever guide 32.

Two guide holes 335 extend slenderly in right-left direction DCD. Each of two guide holes 335 has respective one of guide pins 35 inserted therein. Guide pins 35 are fixed to the lower surface of lever guide 32 with a screw.

Edge section 33E of opening 330 includes R-side contact section 331, HP-side contact section 332, and opening-and-closing section 333.

As illustrated in FIG. 2, a portion of R-side contact section 331 at edge 330E of opening 330 is exposed from movable-path slit 321 when operating lever 20 is located at home position 322. The portion of R-side contact section 331 inclines with respect to front-rear direction DAB. When operating lever 20 moves from home position 322 to R position 323, particularly when operating lever 20 moves from intersection position 325 to R position 323 in rear direction DB, operating lever 20 moves to R position 323 in rear direction DB while contacting R-side contact section 331. R-side contact section 331 inclining with respect to front-rear direction DAB causes stopper 33 to be pressed and urged by operating lever 20 in conjunction with a movement of operating lever 20 in rear direction DB, thereby sliding and moving in rightward direction DD along right-left direction DCD in which two guide holes 335 extend slenderly.

HP-side contact section 332 in edge section 33E of opening 330 is exposed from movable-path slit 321B extending from home position 322 to intersection position 325 when operating lever 20 is located at R position 323. Thus, when operating lever 20 moves from R position 323 to home position 322, operating lever 20 moves to home position 322 in leftward direction DC while contacting HP-side contact section 332. In conjunction with this movement, stopper 33 is urged and pressed by operating lever 20, thereby sliding and moving in leftward direction DC along right-left direction DCD. As illustrated in FIG. 2, as operating lever 20 moves toward home position 322, R-side contact section 331 becomes exposed from movable-path slit 321. When operating lever 20 is located at home position 322, R-side contact section 331 is exposed from movable-path slit 321, as illustrated in FIG. 2.

When opening-and-closing section 333 in edge section 33E of opening 330 of operating lever 20 moves toward R position 323, opening-and-closing section 333 in edge section 33E of opening 330 slides in rightward direction DD and is exposed from opening-and-closing target path 1321 out of movable-path slit 321 extending from intersection position 325 to D position 324. Thus, when operating lever 20 is located at R position 323 in movable-path slit 321, opening-and-closing section 333 blocks opening-and-closing target path 1321 extending from intersection position 325 to D position 324, accordingly causing stopper 33 to inhibit operating lever 20 from moving through only movable-path slit 321A directly to D position 324 without entering in movable-path slit 321B after moving in along movable-path slit 321A from R position 323.

When a driver tries to move operating lever 20 from R position 323 directly to D position 324 not through movable-path slit 321B, operating lever 20 contacts opening-and-closing section 333. Stopper 33 slides only along right-left direction DCD and does not slide in front-rear direction DAB. Therefore, after operating lever 20 contacts opening-and-closing section 333, operating lever 20 does not move along front-rear direction DAB, particularly in front direction DA.

Stopper 34 is made of a thin hard material, such as metal, and has a curved surface along the curved surfaces of lever guide 32 and stopper 33. Stopper 34 includes four protrusions 344. Stopper 34 has opening 340 and two guide holes 345 therein. Stopper 34 includes edge section 34E connected to edge 340E facing opening 340. Edge section 34E of stopper 34 includes D-side contact section 341, HP-side contact section 342, and opening-and-closing section 343. Stopper 34 overlaps stopper 33 in downward direction DF. That is, stoppers 33 and 34 overlap lever guide 32 in downward direction DF.

Four protrusions 344 are provided on an upper surface of stopper 34 so that four protrusions 344 contact a lower surface of stopper 33 to produce a gap between stopper 34 and stopper 33 while stopper 34 overlaps stopper 33.

Two guide holes 345 extend slenderly in right-left direction DCD. Each of two guide holes 345 has respective one of guide pins 35 inserted therein.

As illustrated in FIG. 2, a portion of D-side contact section 341 at edge 240E of opening 340 is exposed from movable-path slit 321 when operating lever 20 is located at in home position 322. The portion of D-side contact section 341 inclines with respect to front-rear direction DAB. When operating lever 20 moves from home position 322 toward D position 324, particularly when operating lever 20 moves from intersection position 325 toward D position 324, operating lever 20 moves to D position 324 in front direction DA while contacting D-side contact section 341. D-side contact section 341 inclining with respect to front-rear direction DAB causes stopper 34 to be urged and pressed by operating lever 20 in conjunction with the movement of operating lever 20 in front direction DA, thereby sliding and moving in rightward direction DD along right-left direction DCD in which two guide holes 345 extend slenderly.

HP-side contact section 342 is exposed from movable-path slit 321B extending from home position 322 to intersection position 325 when operating lever 20 is located at D position 324. Thus, when operating lever 20 moves from D position 324 to home position 322, operating lever 20 moves to home position 322 in leftward direction DC while contacting HP-side contact section 342. As a result, in conjunction with the movement of operating lever 20 in leftward direction DC, stopper 34 is urged and pressed by operating lever 20, thereby sliding and moving in leftward direction DC along right-left direction DCD. When operating lever 20 reaches home position 322, R-side contact section 341 is exposed from movable-path slit 321, as illustrated in FIG. 2.

When operating lever 20 moves to D position 324, stopper 34 slides in rightward direction DD, and causes opening-and-closing section 343 in edge section 34E of stopper 34 to be exposed from a portion of movable-path slit 321 between intersection position 325 and R position 323. Thus, after operating lever 20 moves to D position 324, opening-and-closing target path 2321 out of movable-path slit 321 which extends from intersection position 325 to R position 323 is blocked, and then, stopper 34 inhibits operating lever 20 from moving directly to R position 323 without entering into movable-path slit 321B after moving from D position 324 to movable-path slit 321A.

When a driver tries to move operating lever 20 from D position 324 directly to R position 323 in rear direction DB, operating lever 20 contacts opening-and-closing section 343. Stopper 34 slides only along right-left direction DCD and does not slide in front-rear direction DAB. Therefore, after operating lever 20 moves in rear direction DB and contacts opening-and-closing section 343, operating lever 20 does not move along front-rear direction DAB, particularly in rear direction DB.

As illustrated in FIG. 1B and FIG. 3, driving section 40 includes operating lever 20, holder 201, support ball 202, supporter 203, four electromagnetic coils 401, two pairs of magnetic yokes 402, two pairs of driving magnets 403, two pairs of magnetic back yokes 404, and base 405.

Base 405 holds operating lever 20, holder 201, support ball 202, supporter 203, four electromagnetic coils 401, two pairs of magnetic yokes 402, two pairs of driving magnets 403, and two pairs of magnetic back yokes 404.

Operating lever 20 is configured such that a driver operates operating lever 20 to switch an operation mode, as described above.

Holder 201 holds operating lever 20. Holder 201 includes engaging surface 210 having a concave surface. Support ball 202 has substantially a spherical shape and has engaging surface 220. Supporter 203 supports support ball 202. Engaging surface 210 is movably engaged with engaging surface 220 to contact a point or a line on engaging surface 220. This configuration allows supporter 203 to support operating lever 20 pivotally about support ball 202.

Each of four electromagnetic coils 401 is wound around respective one of two pairs of magnetic yokes 402. Two pairs of magnetic yokes 402 are made of magnetic material, and are each arranged to face each other in each pair. Magnetic yokes 402 having electromagnetic coils 401 wound thereon are fixed to base 405.

Two pairs of magnetic back yokes 404 are made of material with high magnetic permeability, and arranged in holder 201 to face each other in each pair. Each of driving magnets 403 is arranged in holder 201 to contact respective one of magnetic back yokes 404.

When operating lever 20 is located at home position 322, each of two pairs of driving magnets 403 entirely overlaps respective one of magnetic yokes 402 (see FIG. 1B and FIG. 3).

Each of driving magnets 403 functions as an attracting magnet, and magnetic attraction force is generated between each of driving magnets 403 and respective one of magnetic yokes 402. A current flowing through each of electromagnetic coils 401 wound around respective one of magnetic yokes 402 causes respective one of driving magnets 403 to receive electromagnetic force, thereby rotatably driving operating lever 20 so that each of driving magnets 403 faces respective one of magnetic yokes 402, in other words, the entirety of respective one of driving magnets 403 overlaps respective one of magnetic yokes 402. Specifically, operating lever 20 rotates about axis AX1 passing through the center of support ball 202 between one pair of driving magnets 403 out of two pairs of driving magnets 403, and rotates about axis AX2 passing through the center of support ball 202 between the other pair of driving magnets 403. Furthermore, operating lever 20 rotates about third axis AX3 extending in up-down direction DEF and passing through the center of support ball 202. In other words, operating lever 20 is pivotally supported by supporter 203 rotatably about three axes AX1 to AX3. Operating lever 20 is driven rotationally about axes AX1, AX2, and AX3, thereby moving along movable-path slit 321 so that each of driving magnets 403 faces respective one of magnetic yokes 402.

For example, when a driver has a hand removed from operating lever 20 after operating lever 20 moves to R position 323, operating lever 20 is rotationally driven as described above to move to home position 322, i.e., an original position. Similarly, when a driver has a hand removed from operating lever 20 after operating lever 20 moves to D position 324, operating lever 20 is rotationally driven to move to home position 322, i.e., the original position.

Driving section 40 causes a current flowing electromagnetic coil 401 to generate electromagnetic force, thereby causing operating lever 20 moved to R position 323 or D position 324 to be electromagnetically driven to automatically move to home position 322.

The change of the duration or amount of the current flowing through electromagnetic coil 401 can provide a driver (an operator) with a touch feeling, such as a click feeling or a viscous feeling.

An operation of stopper 33 and stopper 34 in conjunction with the movement of operating lever 20 will be described below. FIG. 5A to FIG. 5E and FIG. 6A to FIG. 6E illustrate the operation of selector 10.

Figure 4A:
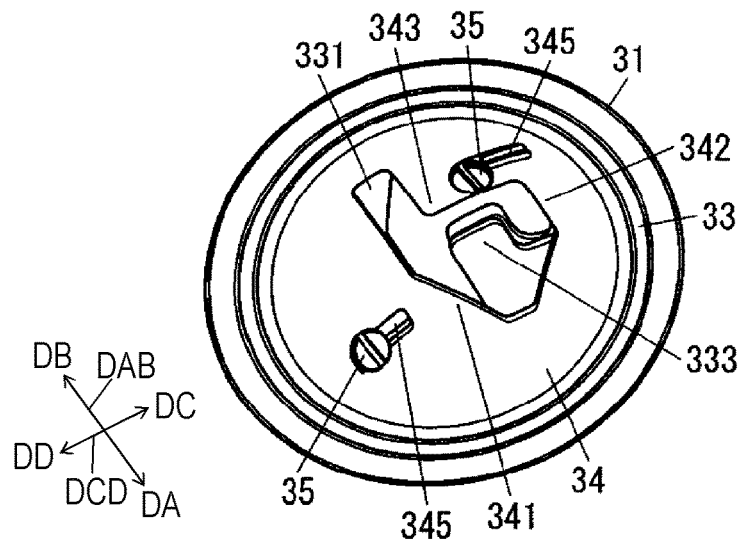
FIGS. 4A to 4C are bottom perspective views of the selector according to the embodiment.
Figure 5A:
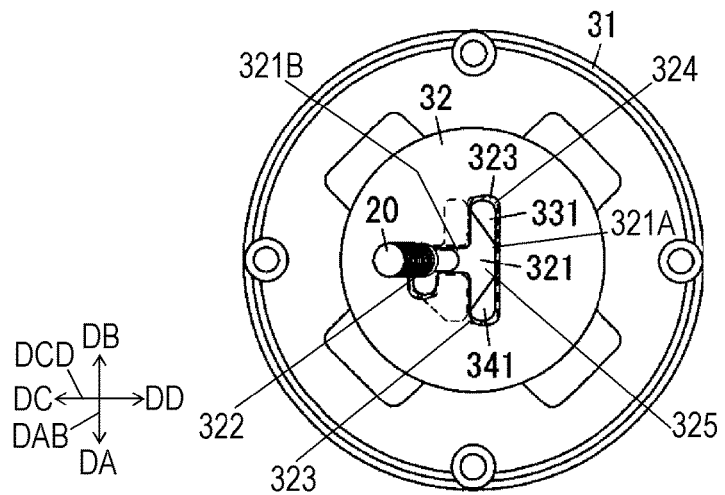
FIGS. 5A to 5E are plan views of the selector according to the embodiment for illustrating an operation of the selector.
Figure 5B:
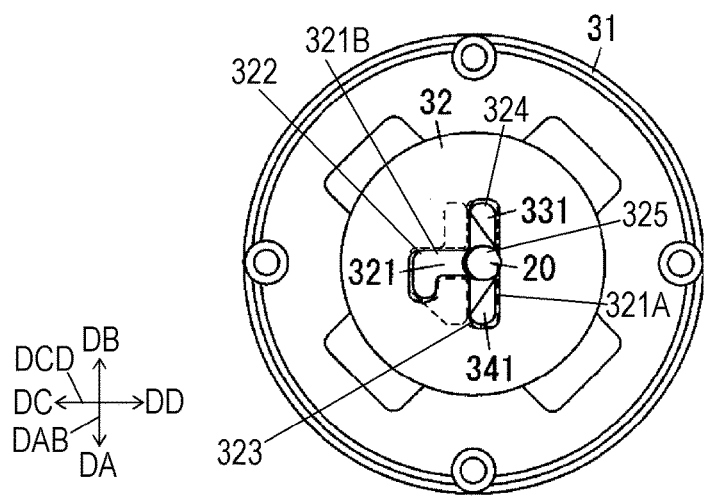
Figure 5C:
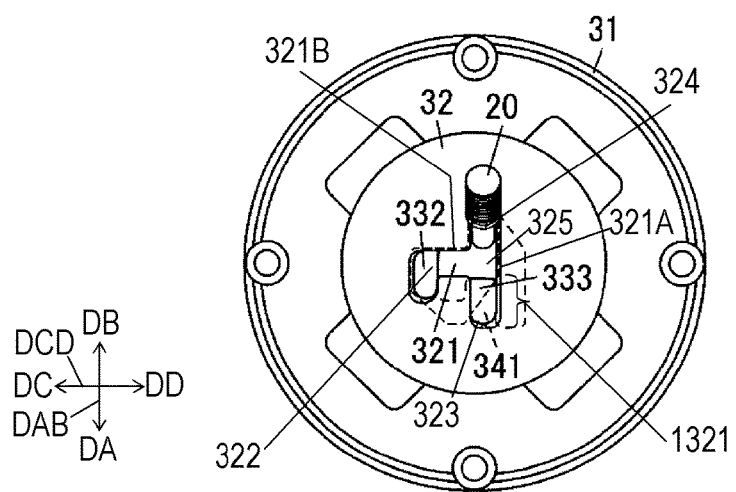
Figure 6A:
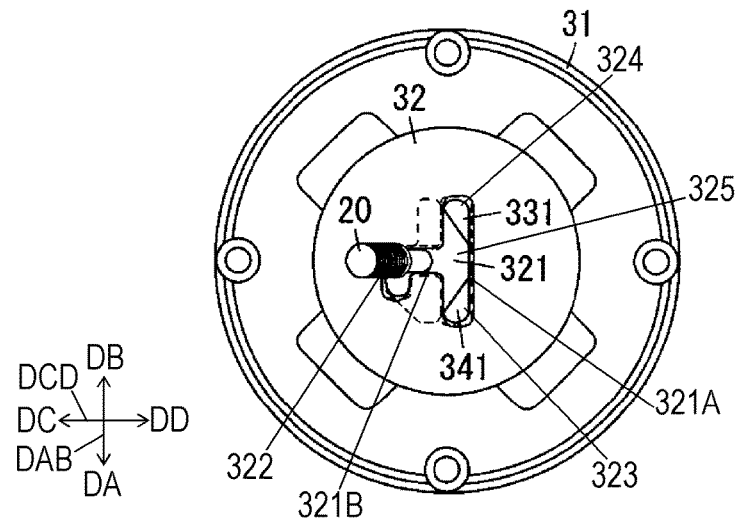
FIGS. 6A to 6E are plan views of the selector according to the embodiment for illustrating the operation of the selector.
Figure 6B:
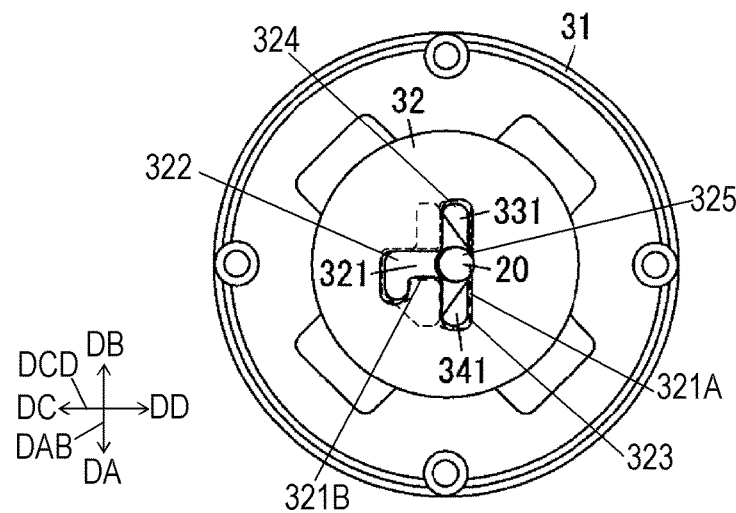
Figure 6C:
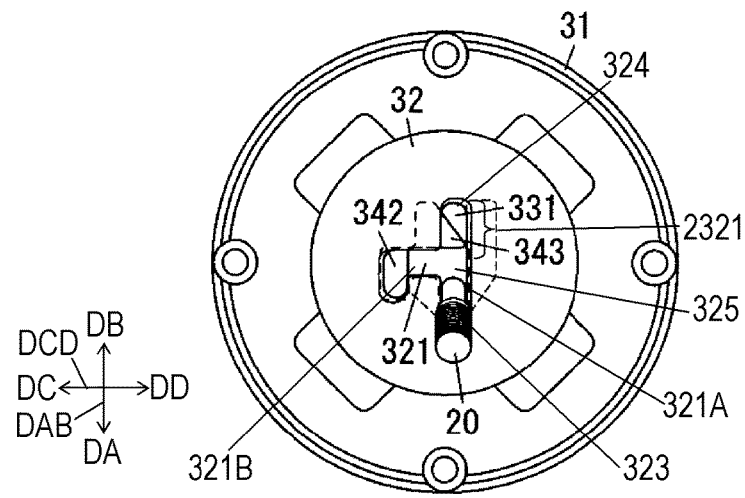

Operating lever 20 is located normally at home position 322 (see FIG. 5A and FIG. 6A). At this moment, stoppers 33 and 34 overlap each other while the central axes of stoppers 33 and 34 substantially coincide with each other (see FIG. 4A).

When operating lever 20 moves along movable-path slit 321B from home position 322 to intersection position 325 in rightward direction DD along right-left direction DCD, operating lever 20 does not contact any of stoppers 33 and 34, and does not urge any of stoppers 33 and 34. Accordingly, any of stopper 33 and stopper 34 does not slide in conjunction with the movement of operating lever 20 along movable-path slit 321B from home position 322 to intersection position 325 in rightward direction DD. In other words, similarly to the case that operating lever 20 is located at home position 322, when operating lever 20 moves along movable-path slit 321B from home position 322 to intersection position 325 in rightward direction DD along right-left direction DCD, stoppers 33 and 34 overlap each other to have the outer circumference edges thereof substantially coincide with each other (see FIG. 4A).

Figure 4B:
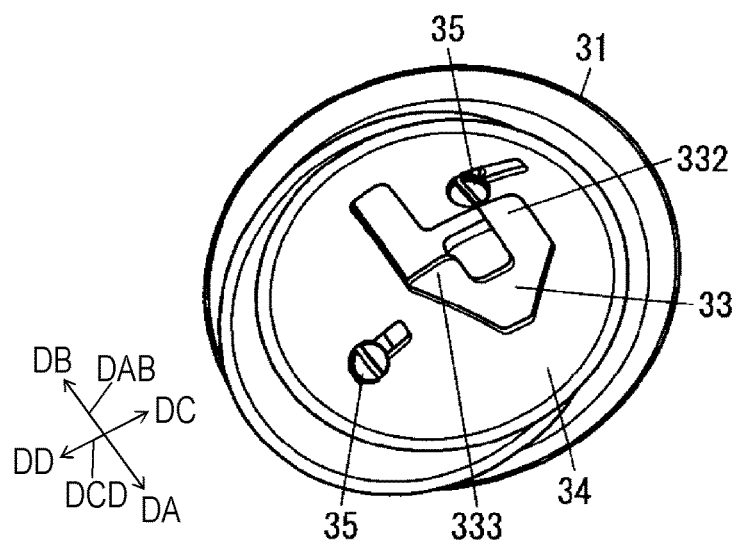

When operating lever 20 moves from home position 322 to intersection position 325 and then further moves from intersection position 325 to R position 323, operating lever 20 contacts R-side contact section 331 in edge section 33E facing opening 330 of stopper 33, thereby causing stopper 33 to slide in rightward direction DD along right-left direction DCD in conjunction with the movement of operating lever 20 (see FIG. 4B). At this moment, the length along which stopper 33 slides is limited to the length of guide hole 335. The sliding of stopper 33 in rightward direction DD inhibits R-side contact section 331 from being exposed from movable-path slit 321, and causes HP-side contact section 332 and opening-and-closing section 333 to be exposed from movable-path slit 321 instead (see FIG. 5C). In contrast, stopper 34 does not contact operating lever 20 and is not urged, and therefore, does not move even when operating lever 20 moves to R position 323.

Figure 4C:
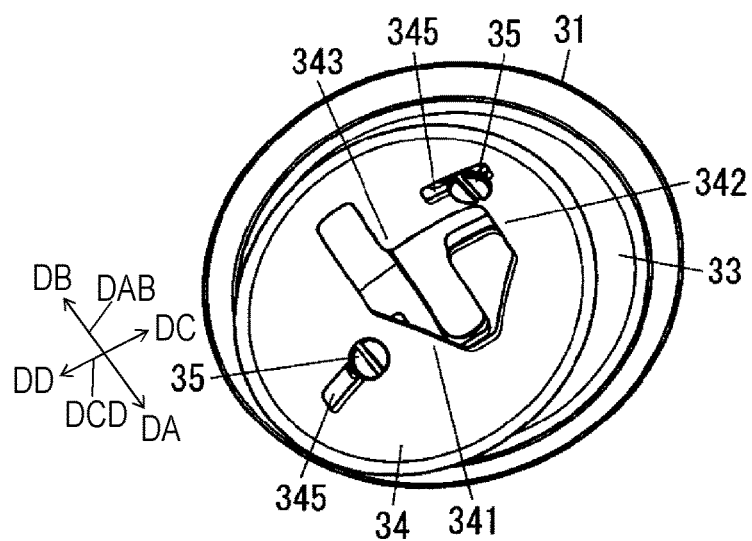

When operating lever 20 moves from home position 322 to intersection position 325 and then further moves from intersection position 325 to D position 324, operating lever 20 contacts D-side contact section 341 in edge section 34E facing opening 340 of stopper 34, thereby causing stopper 34 to slide in rightward direction DD along right-left direction DCD in conjunction with the movement of operating lever 20 (see FIG. 4C). At this moment, the length along which stopper 34 slides is limited to the length of guide hole 345. The sliding of stopper 34 in rightward direction DD inhibits D-side contact section 341 from being exposed from movable-path slit 321, and causes HP-side contact section 342 and opening-and-closing section 343 to be exposed from movable-path slit 321 instead (see FIG. 6C). In contrast, stopper 33 does not contact operating lever 20, thereby not being urged, and thus, does not slide even when operating lever 20 moves to D position 324.

When a driver has a hand removed from operating lever 20 after operating lever 20 moves to any one of R position 323 and D position 324, operating lever 20 moves to home position 322 as described below by the above-described rotational driving of driving section 40.

Figure 5D:
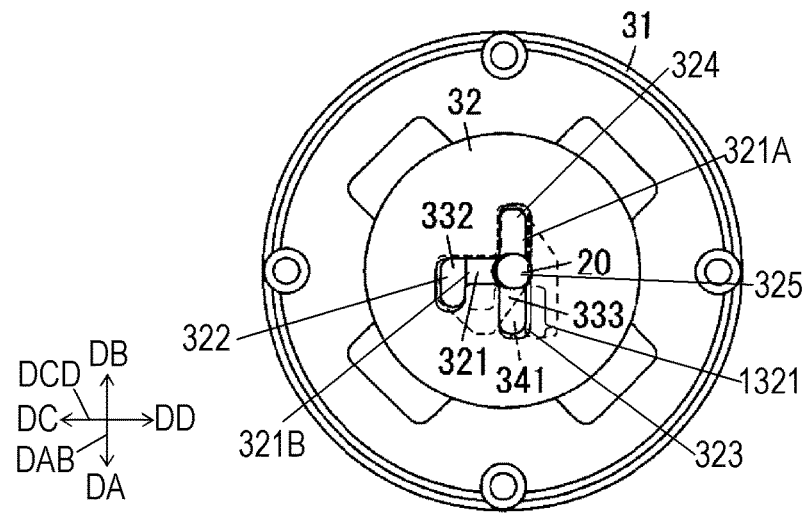
Figure 5E:
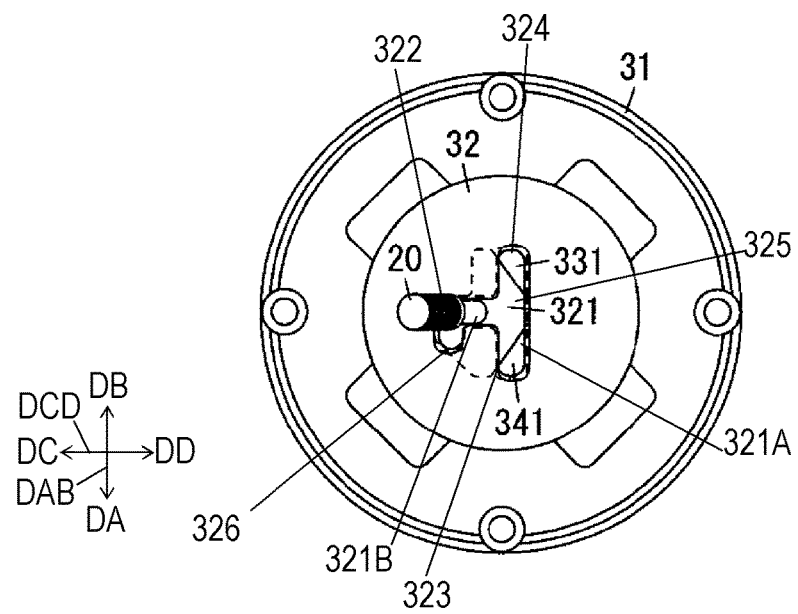
Figure 6D:
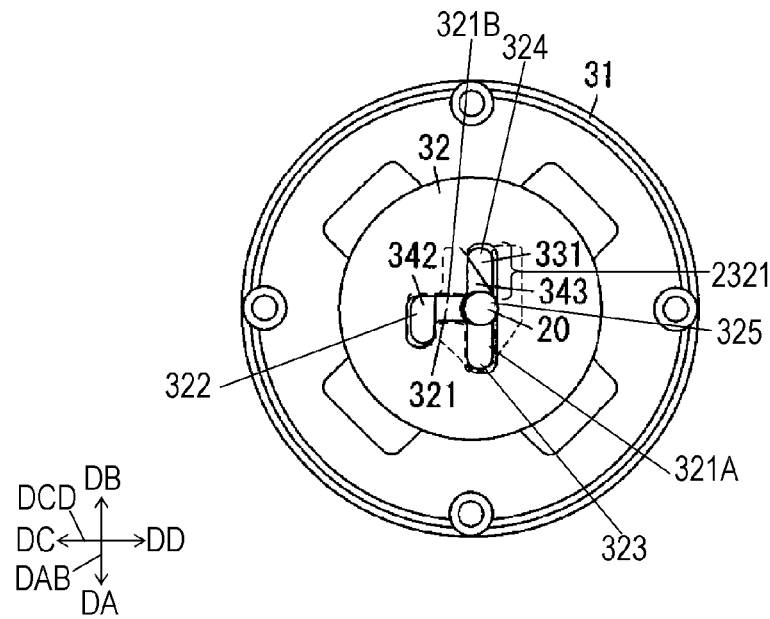
Figure 6E:
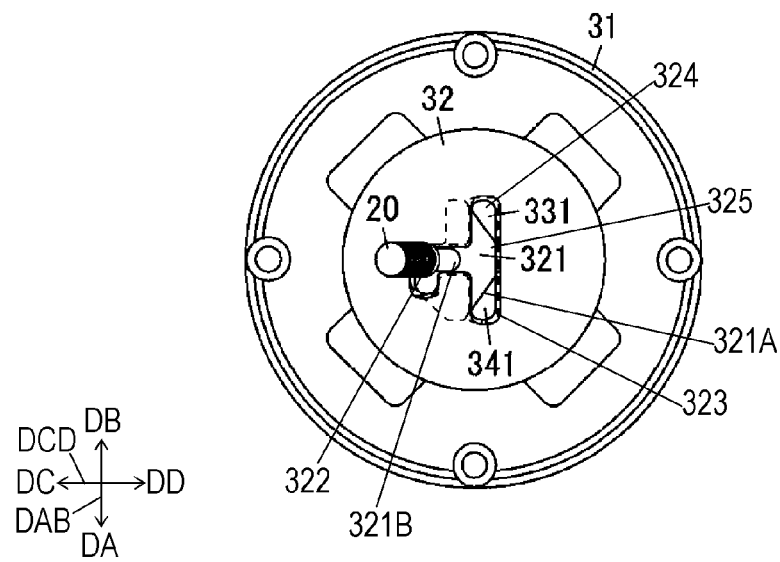

Operating lever 20 having moved to R position 323 returns from R position 323 to intersection position 325 (see FIG. 5D and FIG. 6D). At this moment, opening-and-closing section 333 blocks the path, and therefore, operating lever 20 does not move to D position 324 via intersection position 325 from R position 323.

Operating lever 20 having moved to D position 324 returns from D position 324 to intersection position 325 (see FIG. 5D and FIG. 6D). At this moment, opening-and-closing section 343 blocks the path, and therefore, operating lever 20 does not move to R position 323 via intersection position 325 from D position 324.

Operating lever 20 thus having returned to intersection position 325 moves from intersection position 325 to home position 322.

When operating lever 20 moves from R position 323 to home position 322, operating lever 20 contacts HP-side contact section 332 of stopper 33, thereby causing stopper 33 to slide in leftward direction DC along right-left direction DCD in conjunction with the movement of operating lever 20. In contrast, stopper 34 does not contact operating lever 20, thereby not being urged, and thus, does not slide even when operating lever 20 moves from R position 323 to home position 322. Therefore, when operating lever 20 moves from R position 323 to home position 322, stoppers 33 and 34 overlap each other while substantially coinciding with each other viewing from up-down direction DEF (see FIG. 4A). At this moment, R-side contact section 331 of stopper 33 and D-side contact section 341 of stopper 34 are exposed from movable-path slit 321.

When operating lever 20 moves from D position 324 to home position 322, operating lever 20 contacts HP-side contact section 342 of stopper 34, thereby causing stopper 34 to slide in leftward direction DC along right-left direction DCD in conjunction with the movement of operating lever 20. In contrast, stopper 33 does not contact operating lever 20, thereby not being urged, and thus, does not slide even when operating lever 20 moves from D position 324 to home position 322. Therefore, when operating lever 20 moves from D position 324 to home position 322, stoppers 33 and 34 overlap each other while substantially coinciding with each other viewing from up-down direction DEF (see FIG. 4A). At this moment, R-side contact section 331 of stopper 33 and D-side contact section 341 of stopper 34 are exposed from movable-path slit 321.

After the movement of operating lever 20 from home position 322 to R position 323, even if a driver tries to further move operating lever 20 from R position 323 directly to D position 324, the following configuration inhibits operating lever 20 from moving to D position 324. Stopper 33 can move only in right-left direction DCD along guide hole 335 extending slenderly in right-left direction DCD. Therefore, after operating lever 20 contacts opening-and-closing section 333 of stopper 33 at intersection position 325, even if the driver tries to further move operating lever 20 to D position 324, guide hole 335 extending slenderly in right-left direction DCD inhibits stopper 33 from moving in front-rear direction DAB. Thus, operating lever 20 cannot move from intersection position 325 to D position 324.

After the movement of operating lever 20 from home position 322 to D position 324, even if the driver tries to further move operating lever 20 from D position 324 directly to R position 323, the following configuration inhibits operating lever 20 from moving to R position 323. Stopper 34 can move only in right-left direction DCD along guide hole 345 extending slenderly in right-left direction DCD. After operating lever 20 contacts opening-and-closing section 343 of stopper 34 at intersection position 325, even if the driver tries to further move operating lever 20 to D position 324, stopper 34 does not move in front-rear direction DAB. Thus, operating lever 20 cannot move from intersection position 325 to R position 323.

In the above-described conventional shift lock apparatus serving as a selector of a comparative embodiment selector restricts the movement of an operating lever by use of a solenoid, if an electromagnetic force of the solenoid is weak, the operating lever can move through even a path in which the movement of the lever is restricted, depending on the degree of an operator's power. Therefore, it has been desired that a movement path of a shift lever (operating lever) is restricted by a method other than electromagnetic driving.

Selector 10 according to the present embodiment restricts the movement path of operating lever 20 by use of stopper device 530 including two stoppers 33 and 34 movable to slide only in right-left direction DCD. For example, when operating lever 20 moves from R position 323 directly to D position 324 without entering in movable-path slit 321B, operating lever 20 contacts opening-and-closing section 333 of stopper 33, and disables operating lever 20 to move in front direction DA along front-rear direction DAB.

Thus, selector 10 according to the present embodiment can restrict the movement of operating lever 20 more reliably than the selector of the comparative embodiment.

In selector 10 according to the present embodiment, lever guide 32, stopper 33, and stopper 34 each have the curved surface, but may not necessarily have this surface, and may have a flat surface as to overlap each other and be movable relative to each other.

In accordance with the present embodiment, operating lever 20 is pivotally supported about support ball 202, but is not limited to this configuration. A portion that supports operating lever 20 moves in conjunction with the movement of operating lever 20, thereby causing operating lever 20 to move in parallel.

In accordance with the present embodiment, after operating lever 20 moves to R position 323 or D position 324, operating lever 20 automatically returns to home position 322 by the electromagnetic driving of driving section 40, but is not limited to this configuration. After moving movement to R position 323 or D position 324, operating lever 20 may automatically return to home position 322 by a spring mechanism instead of the electromagnetic driving. Alternatively, operating lever 20 may stay at any position of R position 323 or D position 324 to which operating lever 20 moves.

In accordance with the present embodiment, movable-path slits 321A and 321B intersect perpendicularly, but may intersect at an angle that can be regarded as 90 degrees. Furthermore, movable-path slits 321A and 321B may intersect at an angle other than 90 degrees. In this case, guide holes 335 and 345 extending slenderly in a direction in which stoppers 33 and 34 move extend slenderly in a direction along movable-path slit 321B.

In accordance with the present embodiment, selector 10 includes stopper 33 and stopper 34, thereby inhibiting operating lever 20 from moving from R position 323 directly to D position 324, and inhibiting operating lever 20 from moving from D position 324 directly to R position 323, but, is not limited to this configuration. In the case where stopper device 530 of selector 10 includes only stopper 33 and does not include stopper 34, operating lever 20 is inhibited from moving from R position 323 directly to D position 324 without passing through movable-path slit 321B, but, is not inhibited from moving from D position 324 directly to R position 323 without passing through movable-path slit 321B. In contrast, in the case where stopper device 530 of selector 10 includes only stopper 34 and does not include stopper 33, operating lever 20 is inhibited from moving from D position 324 directly to R position 323 without passing through movable-path slit 321B, but, is not inhibited from moving from R position 323 directly to D position 324 without passing through movable-path slit 321B.

Selector 10 restricts operating lever 20 by use of two stoppers 33 and 34 so that operating lever 20 does not move directly between two selectable positions, but, is not limited to this configuration. Three or more stoppers can inhibit operating lever 20 not to move directly between the two selectable positions, namely, R position 323 and D position 324.

Selector 10 restricts the movement of operating lever 20 between R position 323 and D position 324. In other words, selector 10 inhibits a direct change from the drive mode to the reverse mode or from the reverse mode to the drive mode, but is not limited to this configuration. For example, selector 10 may inhibit a direct change from the drive mode (the reverse mode) to the brake mode, or a direct change from the brake mode to the drive mode (the reverse mode). In other words, in two modes (a first mode and a second mode) inhibiting direct interchange, selector 10 according to the embodiment inhibits the second mode from being directly selected by the movement of operating lever 20 after the selection of the first mode.

In accordance with the present embodiment, when selecting the brake mode, operating lever 20 surely passes through home position 322, but, is not limited to this configuration. The brake mode may be selected, for example, after operating lever 20 passes through a selectable position for the drive mode (D position 324) without passing through home position 322.

A portion of R-side contact section 331 in edge section 33E of stopper 33 is exposed from movable-path slit 321 when operating lever 20 is located at home position 322. In accordance with the present embodiment, the portion of R-side contact section 331 has a linear shape inclining with respect to front-rear direction DAB, but is not limited to this configuration. The portion of R-side contact section 331 which is exposed from movable-path slit 321 when operating lever 20 is located at home position 322 may have a step shape or a curve shape with respect to front-rear direction DAB. In other words, the shape of R-side contact section 331 at the time when operating lever 20 moves to R position 323 is not limited to a particular shape as long as operating lever 20 contacts R-side contact section 331 and R-side contact section 331 moves in right-left direction DCD in conjunction with the movement of operating lever 20. The shape of D-side contact section 341 at the time when operating lever 20 moves to D position 324 is not limited to a particular shape as long as operating lever 20 contacts D-side contact section 341 and D-side contact section 341 and stopper 34 moves in right-left direction DCD in conjunction with the movement of operating lever 20.

In accordance with the present embodiment, stoppers 33 and 34 slide in right-left direction DCD in conjunction with the movement of operating lever 20, but is not limited to this configuration. Stoppers 33 and 34 may rotate in conjunction with the movement of operating lever 20.

Stopper 33 is located in upward direction DE from stopper 34 and located between lever guide 32 and stopper 34. Stopper 34 may be located in upward direction DE from stopper 33 and located between lever guide 32 and stopper 33 instead.

In accordance with the present embodiment, protrusions 334 that contact lever guide 32 as to form a gap between stopper 33 and lever guide 32 are provided on the upper surface of stopper 33, but are not limited to this configuration. Instead of protrusions 334, a protrusion may be provided on a lower surface of lever guide 32 as to form a gap between stopper 33 and lever guide 32. In other words, one of lever guide 32 and stopper device 530 may include a protrusion that contacts another of lever guide 32 and stopper device 530 as to form a gap between stopper device 530 and lever guide 32.

Protrusions 344 are provided on the upper surface of stopper 34 as to form a gap between stopper 34 and stopper 33, but are not limited to this configuration. Instead of protrusions 344, a protrusion may be provided on a lower surface of stopper 33 as to form a gap between stopper 33 and stopper 34.

In accordance with present embodiment, selector 10 is used for vehicles, but, the use thereof is not limited to this. Selector 10 may be used not only for vehicles, but also for, e.g., aircrafts and ships for changing an operation mode thereof.

Selector 10 to be used for the purpose of changing an operation mode has been described, but, may be used for a purpose other than the change of an operation mode. Selector 10 may be used for selecting one of plural options by moving operating lever 20.

As described above, lever guide 32 of selector 10 has therein movable-path slit 321A and movable-path slit 321B. Movable-path slit 321A extends from R position 323 to D position 324 along front-rear direction DAB. Movable-path slit 321B extends along right-left direction DCD different from front-rear direction DAB as to intersect with movable-path slit 321A at intersection position 325. Movable-path slit 321B includes home position 322. Operating lever 20 is movable in along movable-path slits 321A and 321B. Operating lever 20 is configured to move to R position 323 along movable-path slits 321A and 321B to select R position 323, and move to D position 324 along movable-path slits 321A and 321B to select D position 324. Stopper 33 overlaps lever guide 32 and slides in conjunction with a movement of operating lever 20. Stopper 33 includes R-side contact section 331, HP-side contact section 332, and opening-and-closing section 333. R-side contact section 331 slides and contacts operating lever 20 when operating lever 20 moves from home position 322 to R position 323. HP-side contact section 332 slides and contacts operating lever 20 when operating lever 20 moves from R position 323 to home position 322. Opening-and-closing section 333 opens and closes opening-and-closing target path 1321 out of movable-path slit 321A between D position 324 and intersection position 325 in conjunction with a movement of operating lever 20. Opening-and-closing section 333 blocks opening-and-closing target path 1321 in conjunction with the sliding of R-side contact section 331, and opens opening-and-closing target path 1321 in conjunction with the sliding of HP-side contact section 332.

Stopper 33 may slide in right-left direction DCD.

R-side contact section 331 may be exposed from movable-path slit 321A and incline with respect to front-rear direction DAB when operating lever 20 is located at home position 322.

Selector 10 may further include stopper 34 overlapping lever guide 32 and sliding in conjunction with a movement of operating lever 20. Stopper 34 includes D-side contact section 341, HP-side contact section 342, and opening-and-closing section 343. D-side contact section 341 slides and contacts operating lever 20 when operating lever 20 moves from home position 322 to D position 324. HP-side contact section 342 slides and contacts operating lever 20 when operating lever 20 moves from D position 324 to home position 322. Opening-and-closing section 343 opens and closes opening-and-closing target path 2321 out of movable-path slit 321A between R position 323 and intersection position 325 in conjunction with a movement of operating lever 20. Opening-and-closing section 343 blocks opening-and-closing target path 2321 in conjunction with the sliding of D-side contact section 341, and opens opening-and-closing target path 2321 in conjunction with the sliding of HP-side contact section 342.

When operating lever 20 is located at home position 322, R-side contact section 331 of stopper 33 may be located in opening-and-closing target path 2321 while D-side contact section 341 of stopper 34 may be located in opening-and-closing target path 1321.

Stopper 33 may have opening 330 therein through which operating lever 20 passes. In this case, stopper 33 includes edge 330E facing opening 330 and edge section 33E connected to edge 330E. Edge section 33E includes R-side contact section 331, HP-side contact section 332, and opening-and-closing section 333.

Stopper 34 may have opening 340 therein through which operating lever 20 passes. In this case, stopper 34 includes edge 340E facing opening 340 and edge section 34E connected to edge 340E. Edge section 34E includes D-side contact section 341, HP-side contact section 342, and opening-and-closing section 343.

Selector 10 may further include driving section 40 configured to return operating lever 20 from R position 323 to home position 322.

Driving section 40 may cause operating lever 20 to return from D position 324 to home position 322.

Driving section 40 may include electromagnetic coil 401 configured to cause operating lever 20 to return from R position 323 and D position 324 to home position 322 by electromagnetic driving.

At least one of stoppers 33 and 34 may include protrusions (334, 344) forming a gap between stopper 33 and stopper 34.

One of lever guide 32 and stopper 33 may include protrusions (334, 344) contacting another of lever guide 32 and stopper 33 to form a gap between lever guide 32 and stopper 33.

What is claimed is:

1. A selector comprising:
    a lever guide having a first movable-path slit and a second movable-path slit therein, the first movable-path slit extending from a first position to a second position along a first direction, the second movable-path slit extending along a second direction different from the first direction as to intersect the first movable-path slit at an intersection position, the second movable-path including a third position;
    an operating lever movable in along the first movable-path slit and the second movable-path slit, the operating lever being configured to move to the first position through the first movable-path slit and the second movable-path slit to select the first position and configured to move to the second position to the first position through the first movable-path slit and the second movable-path slit to select the second position; and
    a first stopper overlapping the lever guide and sliding in conjunction with a movement of the operating lever,
    wherein the first stopper includes:
        a first contact section that slides and contacts the operating lever when the operating lever moves from the third position to the first position;
        a second contact section that slides and contacts the operating lever when the operating lever moves from the first position to the third position; and
        a first opening-and-closing section that opens and closes a first opening-and-closing target path out of the first movable-path slit between the second position and the intersection position in conjunction with the movement of the operating lever, and
    wherein the first opening-and-closing section blocks the first opening-and-closing target path in conjunction with a sliding of the first contact section, and opens the first opening-and-closing target path in conjunction with a sliding of the second contact section.

2. The selector according to claim 1, wherein the first stopper slides in the second direction.

3. The selector according to claim 2, wherein the first contact section is exposed from the first movable-path slit and inclines with respect to the first direction while the operating lever is at the third position.

4. The selector according to claim 1,
    wherein the first stopper has an opening therein through which the operating lever passes, and
    wherein the first stopper includes:
        an edge facing the opening; and
        an edge section connected to the edge, the edge section including the first contact section, the second contact section, and the first opening-and-closing section.

5. The selector according to claim 1, further comprising a second stopper overlapping the lever guide and sliding in conjunction with a movement of the operating lever,
    wherein the second stopper includes:

a third contact section that slides and contacts the operating lever when the operating lever moves from the third position to the second position;

a fourth contact section that slides and contacts the operating lever when the operating lever moves from the second position to the third position; and a second opening-and-closing section that opens and closes a second opening-and-closing target path out of the first movable-path slit between the first position and the intersection position in conjunction with a movement of the operating lever, and wherein the second opening-and-closing section blocks the second opening-and-closing target path in conjunction with a sliding of the third contact section, and opens the second opening-and-closing target path in conjunction with a sliding of the fourth contact section.

6. The selector according to claim 5, wherein, when the operating lever is at the third position, the first contact section of the first stopper is located in the second opening-and-closing target path, and the third contact section of the second stopper is located in the first opening-and-closing target path.

7. The selector according to claim 5,
wherein the first stopper has a first opening therein through which the operating lever passes, and
wherein the first stopper includes:
a first edge facing the first opening; and
a first edge section connected to the first edge, the first edge section including the first contact section, the second contact section, and the first opening-and-closing section.

8. The selector according to claim 7,
wherein the second stopper has a second opening therein through which the operating lever passes, and
wherein the second stopper includes:
a second edge facing the second opening; and
a second edge section connected to the second edge, the second edge section including the third contact section, the fourth contact section, and the second opening-and-closing section.

9. The selector according to claim 5, further comprising a driving section that causes the operating lever to return from the first position to the third position.

10. The selector according to claim 9, wherein the driving section causes the operating lever to return from the second position to the third position.

11. The selector according to claim 9, wherein the driving section includes an electromagnetic coil that causes the operating lever to return from the first position and the second position to the third position by electromagnetic driving.

12. The selector according to claim 5, wherein at least one of the first stopper and the second stopper includes a protrusion providing a gap between the first stopper and the second stopper.

13. The selector according to claim 1, wherein one of the lever guide and the first stopper includes a protrusion contacting with another of the lever guide and the first stopper to provide a gap between the lever guide and the first stopper.

14. The selector according to claim 1, further comprising a driving section that causes the operating lever to return from the first position to the third position.

15. The selector according to claim 14, wherein the driving section includes an electromagnetic coil that causes the operating lever to return from the first position to the third position by electromagnetic driving.

* * * * *